United States Patent
Daikokuya et al.

(10) Patent No.: US 7,631,218 B2
(45) Date of Patent: Dec. 8, 2009

(54) RAID SYSTEM AND REBUILD/COPY BACK PROCESSING METHOD THEREOF

(75) Inventors: Hidejirou Daikokuya, Kawasaki (JP); Mikio Ito, Kawasaki (JP); Kazuhiko Ikeuchi, Kawasaki (JP); Shinya Mochizuki, Kawasaki (JP); Hideo Takahashi, Kawasaki (JP); Yoshihito Konta, Kawasaki (JP); Yasutake Sato, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 11/361,583

(22) Filed: Feb. 23, 2006

(65) Prior Publication Data

US 2007/0088976 A1    Apr. 19, 2007

(30) Foreign Application Priority Data

Sep. 30, 2005    (JP) ............................... 2005-286926

(51) Int. Cl.
    *G06F 11/00* (2006.01)
(52) U.S. Cl. ......................................................... 714/6
(58) Field of Classification Search ...................... 714/6, 714/5, 7
    See application file for complete search history.

(56) References Cited

U.S. PATENT DOCUMENTS

| | | | | |
|---|---|---|---|---|
| 695,096 | A * | 3/1902 | Faivre ........................... | 99/402 |
| 5,446,855 | A * | 8/1995 | Dang et al. ..................... | 711/1 |
| 5,455,934 | A * | 10/1995 | Holland et al. .................. | 711/4 |
| 5,537,566 | A | 7/1996 | Konno et al. | |
| 5,761,692 | A * | 6/1998 | Ozden et al. .................... | 711/4 |
| 6,055,354 | A * | 4/2000 | Bopardikar .................... | 386/46 |
| 6,185,368 | B1 * | 2/2001 | Iwasaki et al. ............... | 386/125 |
| 6,233,967 | B1 * | 5/2001 | Seewald et al. ................ | 62/470 |
| 6,321,345 | B1 * | 11/2001 | Mann et al. ..................... | 714/6 |
| 6,336,193 | B1 * | 1/2002 | Yudenfriend et al. .......... | 714/15 |
| 6,542,954 | B1 * | 4/2003 | Aruga ......................... | 710/316 |
| 6,820,172 | B2 * | 11/2004 | Nielsen et al. ............... | 711/114 |
| 6,886,108 | B2 * | 4/2005 | Talagala ......................... | 714/5 |
| 2002/0036882 | A1 * | 3/2002 | Kishi et al. ............... | 361/306.3 |
| 2003/0237019 | A1 * | 12/2003 | Kleiman et al. ................ | 714/6 |
| 2004/0230742 | A1 | 11/2004 | Ikeuchi et al. | |

(Continued)

FOREIGN PATENT DOCUMENTS

JP    5-165581    7/1993

(Continued)

*Primary Examiner*—Michael C Maskulinski
*Assistant Examiner*—Amine Riad
(74) *Attorney, Agent, or Firm*—Greer, Burns & Crain, Ltd.

(57) ABSTRACT

A RAID system access a physical disk according to a host I/O request, and perform Rebuild/Copy back processing, for implementing high-speed Rebuild/Copy back processing without interrupting the processing of a normal I/O. When one disk device out of a plurality of disk devices constituting the RAID configuration fails, the processing size for one time of Rebuild/Copy back to reconstruct the RAID is changed according to the presence of a normal I/O managed in RAID control. When a normal I/O is present, Rebuild/Copy back can be executed without interrupting the processing of the normal I/O, and in a static state where a normal I/O is absent, a processing size larger than the size in that state can be specified so as to implement Rebuild/Copy back processing at high-speed.

16 Claims, 8 Drawing Sheets

U.S. PATENT DOCUMENTS

2005/0283655 A1 * 12/2005 Ashmore .................. 714/7

FOREIGN PATENT DOCUMENTS

| | | |
|---|---|---|
| JP | 6-250795 | 9/1994 |
| JP | 11-102261 | 4/1999 |
| JP | 2000-276305 | 10/2000 |
| JP | 2004-295860 | 10/2004 |

* cited by examiner

RAID SYSTEM AND REBUILD/COPY BACK
PROCESSING METHOD THEREOF

CROSS-REFERENCE TO RELATED
APPLICATIONS

This application is based upon and claims the benefit of priority from the prior Japanese Patent Application No. 2005-286926, filed on Sep. 30, 2005, the entire contents of which are incorporated herein by reference.

BACKGROUND OF THE INVENTION

1. Field of the Invention

The present invention relates to a RAID system that stores data redundantly to a plurality of disk device and performs a Rebuild/Copy back processing for rebuilding/copying back the data, in which, when a part of the disk devices fails, a redundant configuration is reconstructed using data from another disk device, and to a rebuild/copy back processing method thereof, and more particularly to a RAID system and a Rebuild/Copy back processing method thereof for rebuilding/copying back the data with receiving the host I/O.

2. Description of the Related Art

Along with the recent computerization of various data which is handled by computers, data storage devices (external storage devices), which can store large volumes of data efficiently with high reliability independently from the host computer for executing the processing of data, are becoming more and more important.

As such data storage devices, a disk array device having many disk devices (e.g. magnetic disk devices, optical disk devices) and a disk controller for controlling these many disk devices is used. This disk array device implements the redundancy of data by using a RAID configuration so as to improve reliability.

In this disk array device, if a disk device constituting the RAID group fails and loses redundancy, redundancy recovery is required. FIG. 8 is a diagram depicting the rebuild function of RAID 5 for recovering this redundancy. For active maintenance, a spare disk device HS (Hot Spare Disk) is installed in addition to the four disk devices #0, #1, #2 and #3 constituting the RAID 5.

This disk device group 160 is connected to a pair of disk controllers 110 and 120. Each disk controller 110/120 has a disk adapter 140 for controlling the interface with the disk device group 160, a control unit 120, and a channel adapter 100 for controlling the interface with the host (not illustrated).

If the disk device #0, out of the four disk devices constituting the RAID 5, fails, the data of the disk devices #1, #2 and #3, other than the failed disk device #0, is read to the cache memory (not illustrated) of the control unit 120 via the disk adapter 140, and XOR operation of these is performed to create the redundant data.

And through the disk adapter 140, the created redundant data is written to the spare disk device HS to recover redundancy. This is called the "rebuild function".

FIG. 9 is a diagram depicting the copy back function. If the failed disk device #0 is replaced with a new disk device New in a state where Rebuild in FIG. 8 has completed, Copy back processing is performed. In other words, the redundant data written to the spare disk device HS is rewritten to the disk device New.

It is desirable to execute such rebuild/copy back processing while processing an I/O request from the host, and a method to balance the number of these requests has been proposed (e.g. Japanese Patent Application Laid-Open No. 2004-295860).

In order to perform Rebuild/Copy back processing while processing I/O requests from the host, the entire processing for one unit of the disk device cannot be executed all at once. So the processing size to be executed at one time is fixed, and data is read from the normal disk device for this fixed processing size, and is written to the write destination disk device, and this operation is executed for the number of times for completing the data volume of the disk device.

In the case of rebuild, for example, data is read from a normal disk device, redundant data is created other than for RAID 1 (mirroring), and is written to the spare disk device HS or a new disk device New, and in the case of copy back, data is read from the spare disk HS and written to the new disk device New.

Conventionally the processing size of each time is fixed for these operations, and is not changed depending on the load status of the RAID group. So in the case of a system which adjusts for balancing the disk access by a normal I/O (access from host) and disk access by Rebuild/Copy back when a normal I/O is present, that is when a load is being applied, the performance of the disk device cannot be fully expressed when Rebuild/Copy back processing is executed in the status where a normal I/O is absent.

Therefore when a normal I/O is absent, the time until Rebuild/Copy back completes becomes longer compared with the performance of the disk device which is expected as a matter of course. Recently the storage capacities of disk devices are increasing, so decreasing the time until Rebuild/Copy back completes is becoming a critical issue.

SUMMARY OF THE INVENTION

With the foregoing in view, it is an object of the present invention to provide a RAID system for improving the performance of Rebuild/Copy back processing when Rebuild/Copy back is processed balancing with the processing of host I/O requests, and the Rebuild/Copy back processing method thereof.

It is another object of the present invention to provide a RAID system for decreasing the time for Rebuild/Copy back to complete when Rebuild/Copy back is processed balancing with the processing of host I/O requests, and the Rebuild/Copy back processing method thereof.

It is still another object of the present invention to provide a RAID system for performing a balance processing Rebuild/Copy back with the processing of the host I/O requests while decreasing the time for Rebuild/Copy back to complete, and Rebuild/Copy back processing method thereof.

To achieve these objects, the present invention is a RAID system for accessing a connected disk device according to an I/O request from a host and executing the I/O request, having a plurality of disk devices constituting the RAID, and a controller for executing Rebuild or Copy back processing for restructuring the RAID configuration, when one of the plurality of disk devices fails, by executing a plurality of times of operation in parts to read data of a disk device, other than the failed disk, and to write data to a spare disk device or new disk device. And the controller judges whether a normal I/O request, including an I/O request from the host, does not arrive for a predetermined time, and if a normal I/O request does not arrive for a predetermined time, sets the request processing size for one time of Rebuild or Copy back processing to be executed in parts for a plurality of times, larger than the size in the case when the normal I/O request arrives within the predetermined time.

The Rebuild/Copy back processing method for a RAID system of the present invention has the steps of: executing Rebuild or Copy back processing for reconstructing a RAID configuration when one of the plurality of disk devices constituting the RAID fails, by executing a plurality of times of operation in parts to read data of a disk device, other than the failed disk device, and to write data to a spare disk device or new disk device; judging whether a normal I/O request, including an I/O request from the host, does not arrive for a predetermined time; and setting the request processing size for one time of Rebuild or Copy back processing to be executed in parts for a plurality of times larger, if a normal I/O request does not arrive for a predetermined time, compared with the size in the case when the normal I/O request arrives within the predetermined time.

In the present invention, it is preferable that the controller records the processing completion time of a normal I/O request each time when processing of the normal I/O request completes, and compares the processing completion time with the current time to judge whether a normal I/O request does not arrive for a predetermined time.

Also in the present invention, it is preferable that the controller executes balancing the normal I/O request and a request for one time of Rebuild/Copy back, and issues the next Rebuild/Copy back request according to the completion of processing of a Rebuild/Copy back request.

Also in the present invention, it is preferable that the controller further has a progress table for managing the progress status of the Rebuild/Copy back processing, creates a request for one time of Rebuild or Copy back processing according to the progress table, and updates the progress table.

Also in the present invention, it is preferable that the controller further has a RAID control module for executing balancing the normal I/O request and the request for one time of Rebuild/Copy back, and a Rebuild/Copy back module for referring to a progress table for managing the progress status of the Rebuild/Copy back processing, and issuing the next Rebuild/Copy back request according to the completion of processing of a Rebuild/Copy back request.

Also in the present invention, it is preferable that the RAID control module records the processing completion time of a normal I/O request each time when the processing of the normal I/O request completes, and compares the processing completion time with the current time to judge whether a normal I/O request does not arrive for a predetermined time, and the Rebuild/Copy back module inquires of the RAID control module about the judgment result, and if a normal I/O request does not arrive for a predetermined time, the Rebuild/Copy back module issues a Rebuild/Copy back request by setting the request processing size for one time of the Rebuild/Copy back processing larger, compared with the size in the case when the normal I/O request arrives within the predetermined time.

Also in the present invention, it is preferable that if a normal I/O request does not arrive for a predetermined time, the controller sets the request processing size for one time of Rebuild or Copy back processing to be a multiple of the processing size of the case when the I/O request arrives within the predetermined time.

Also in the present invention, it is preferable that the controller further has a first interface circuit for controlling interface with the host, a second interface circuit for controlling interface with the plurality of disk devices, and a control unit which is connected to the first interface circuit and the second interface circuit for executing the normal I/O processing and the Rebuild or Copy back processing, wherein the control unit judges whether a normal I/O request, including an I/O request from the host, does not arrive for a predetermined time, and if a normal I/O request does not arrive for a predetermined time, the request processing size for one time of Rebuild or Copy back processing to be executed in parts for a plurality of times is set larger, compared with the size in the case when the normal I/O request arrives within the predetermined time.

Also in the present invention, it is preferable that when one of the plurality of disk devices constituting the RAID fails, the controller executes the operation to read data of a disk device, other than the failed disk device, and to write data to a spare disk device in parts for a plurality of times, so as to reconstruct the RAID configuration, then executes Copy back processing by executing, in parts for a plurality of times, the operation to read data of the spare disk device and to write data to a new disk device provided in place of the failed disk device.

Also in the present invention, it is preferable that the control unit further has a cache memory for storing a part of the data of the disk device, and requests an I/O request that cannot use the cache memory, out of the I/O requests from the host, as a normal I/O.

In the present invention, the processing size for one time of Rebuild/Copy back is changed according to the presence of a normal I/O managed in RAID control, so if a normal I/O is present, Rebuild/Copy back can be executed without interrupting the processing of the normal I/O, and in a static state where a normal I/O is absent, a processing size larger than that can be specified, so as to implement Rebuild/Copy back processing at high-speed.

DESCRIPTION OF THE PREFERRED EMBODIMENTS

Embodiments of the present invention will now be described in the sequence of disk array device (RAID system), thread configuration, Rebuild/Copy back processing and other embodiments.

Figure 1:
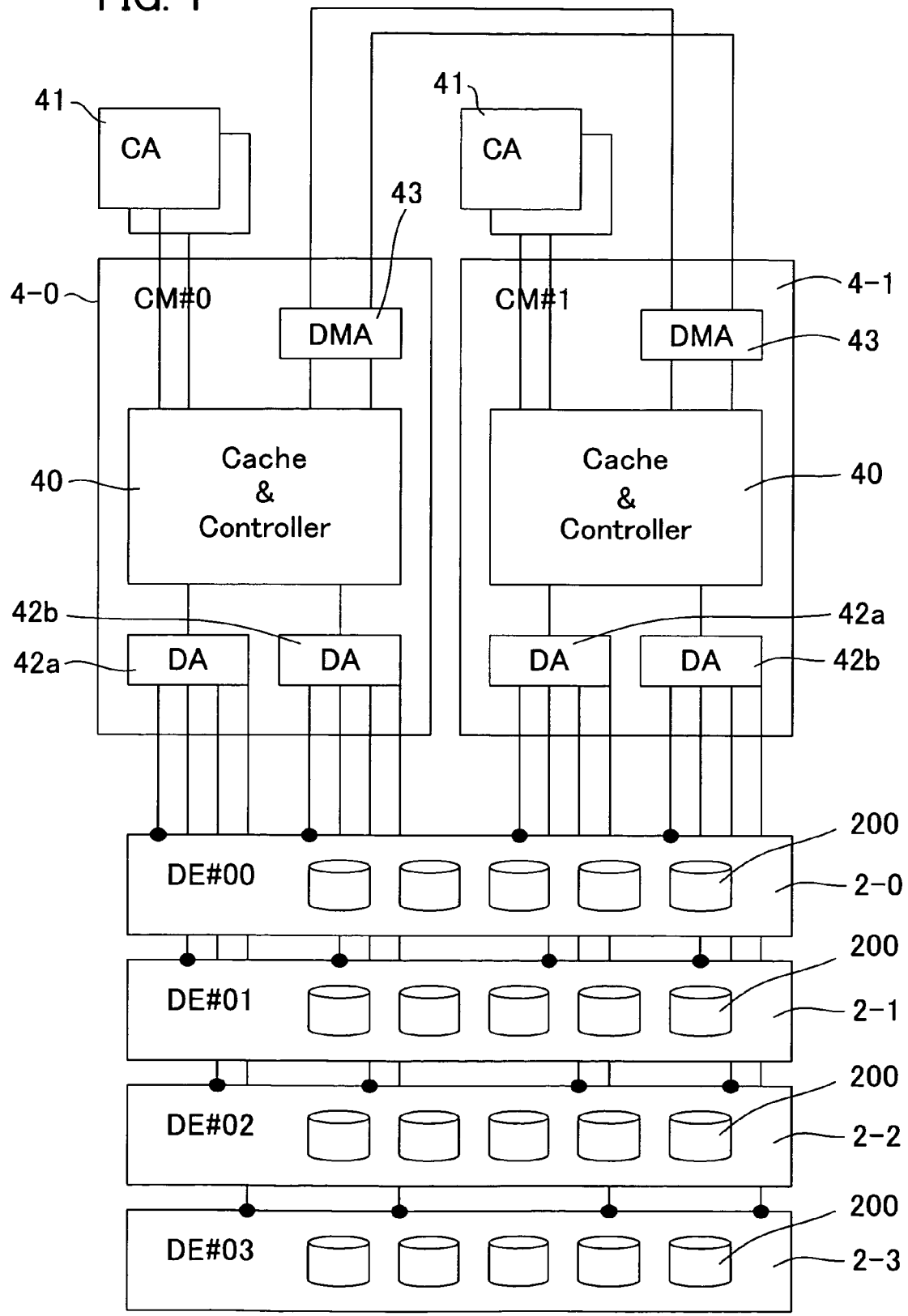
FIG. 1 is a block diagram depicting the disk array device according to an embodiment of the present invention.
Figure 2:
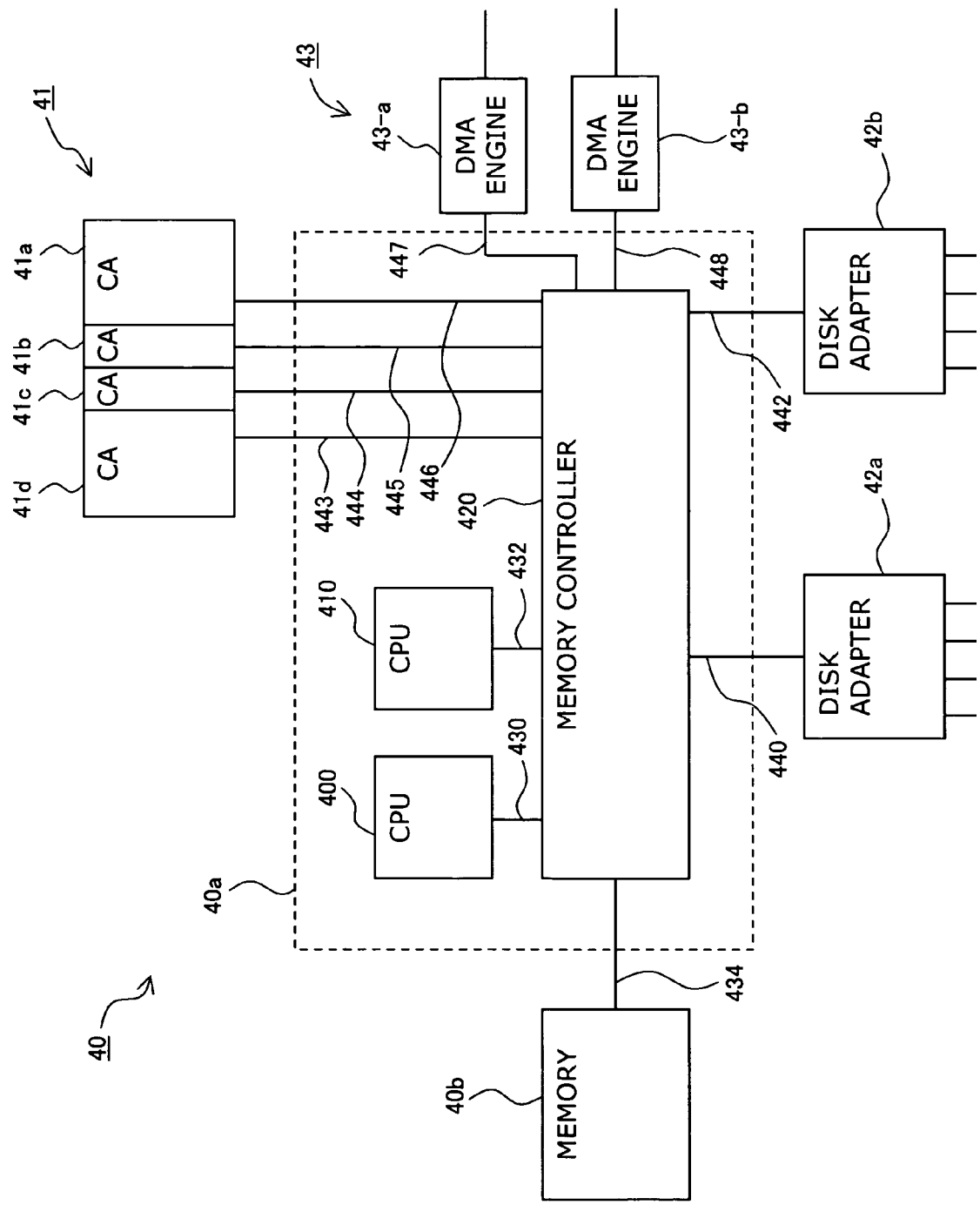
FIG. 2 is a block diagram depicting the control module in FIG. 1.

Disk Array Device:

FIG. 1 is a block diagram depicting the disk array device according to an embodiment of the present invention, and FIG. 2 is a block diagram depicting the control module in FIG. 1.

FIG. 1 shows a small scale disk array device having two control modules as an example, but the present invention can be applied in the same way to a medium scale disk array device with four control modules and a large scale disk array device with eight control modules.

As FIG. 1 shows, the disk array device has a plurality of disk enclosures 2-0 to 2-3 having a plurality of disk devices for holding data, and a plurality of (two in this case) control modules 4-0 to 4-1 installed between a host computer (data processing device), which is not illustrated, and a plurality of disk enclosures 2-0 to 2-3.

Each of the control modules 4-0 to 4-1 has a controller 40, a channel adapter (first interface section: CA in FIG. 1) 41, disk adapters (second interface sections: DA in FIG. 1) 42a and 42b, and a DMA (Direct Memory Access) engine (communication section: DMA in FIG. 1) 43.

The control modules 4-0 to 4-1 will be described with reference to FIG. 1 and FIG. 2. The controller 40 performs read/write processing based on a processing request (read request or write request) from the host computer, and has a memory 40b and a control unit 40a.

The memory 40b has a cache area, which plays a role of a cache for a plurality of disks, for holding a part of the data held in the plurality of disks of the disk enclosures 2-0-2-3, and a work area.

The control unit 40a controls the memory 40b, channel adapter 41, disk adapter 42 and DMA 43. For this, the control unit 40a has one or more (two in FIG. 2) CPUs 400 and 410, and a memory controller 420. The memory controller 420 controls read/write of the memory 40b, and switches the paths.

The memory controller 420 is connected with the memory 40b via the memory bus 434, and is connected with the CPUs 400 and 410 via the CPU buses 430 and 432, and the memory controller 420 is also connected with the disk adapters 42a and 42b via the four lanes of the high-speed serial buses (e.g. PCI-Express) 440 and 442.

In the same way, the memory controller 420 is connected to the channel adapters 41 (four channel adapters 41a, 41b, 41c and 41d in this case) via the four lanes of the high speed serial buses (e.g. PCI-Express) 443, 444, 445 and 446, and is connected to the DMA 43 (two DMAs: 43-a and 43-b in this case) via the four lanes of high-speed serial buses (e.g. PCI-Express) 447 and 448.

This high-speed serial bus, such as PCI-Express, communicates in packets, and can communicate with a low delay and fast response speed, that is at low latency, even if the number of signal lines is decreased, by creating a plurality of lanes of the serial bus.

The channel adapters 41a to 41d are interfaces with the host computer, and the channel adapters 41a to 41d are connected to different computers respectively. Also the channel adapters 41a to 41d are preferably connected to the corresponding interface sections of the host computer respectively via a bus, such as Fiber Channel or Ethernet®, and in this case an optical fiber or coaxial cable is used for the bus.

Each of these channel adapters 41a to 41d is constructed as a part of each control module 4-0 to 4-1. These channel adapters 41a to 41d support a plurality of protocols as the interface sections between corresponding host computers and the control modules 4-0 to 4-3.

Here the protocol to be installed is different depending on the host computer, so each channel adapter 41a to 41d is mounted on a printed circuit board which is different from that of the controller 40, which is a major unit of the control modules 4-0 to 4-1, so that each channel adapter 41a to 41d can be easily replaced when necessary.

For example, a protocol with the host computer to be supported by the channel adapters 41a to 41d is iSCSI (internet Small Computer System Interface) supporting Fiber Channel and Ethernet®.

Each channel adapter 41a to 41d is directly connected to the controller 40 via the bus designed for connecting an LSI (Large Scale Integration) and a printed circuit board, such as a PCI-Express bus. By this, high throughput required between each channel adapter 41a to 41d and the controller 40 can be implemented.

The disk adapters 42a and 42b are the interfaces of the disk enclosures 2-0 to 2-3 to each disk drive, and are connected to the disk enclosures 2-0 to 2-3 and have four FC (Fiber Channel) ports in this case.

Each disk adapter 42a to 42b are directly connected to the controller 40 via a bus designed for connecting an LSI (Large Scale Integration) and a printed circuit board, such as a PCI-Express bus. By this, high throughput required between each disk adapter 42a and 42b and the controller 40 can be implemented.

As FIG. 1 shows, each of the disk enclosures 2-0 to 2-3 has a plurality of (e.g. 15) disk drives 200, each of which comprises two ports. In the disk drive enclosures 2-0 to 2-3, each port of each disk drive 200 is connected to the two ports by a pair of FC cables which are from the two ports.

These two ports are for connecting each disk adapter 42a and 42b of each control module 4-0 to 4-1 to all the disk enclosures 2-0 to 2-3. In other words, the disk adapter 42a of each control module 4-0 to 4-1 is connected to the disk enclosures 2-0 to 2-3. In the same way, the disk adapter 42b of each control module 4-0 to 4-1 is connected to the disk enclosures 2-0 to 2-3.

By this configuration, each control module 4-0 to 4-1 can access all the disk enclosures (disk drives) 2-0 to 2-3 via any disk adapter 42a and 42b via any path.

Each disk adapter 42a/42b and the corresponding disk enclosures 2-0 to 2-3 are connected via a fiber channel, for example, and in this case an optical cable is used since the modules are different.

As FIG. 1 shows, the DMA engine 43 is for mutually communicating with each control module 4-0 to 4-1, and is in-charge of communication and data transfer processing with other control modules. Each of the DMA engines 43 of each control module 4-0 to 4-1 is constructed as a part of each control module 4-0 to 4-1, and is mounted on the board of the controller 40, which is a major unit of each control module 4-0 to 4-1. And by the above mentioned high-speed serial bus, the DMA engine 43 is directly connected with the controller 40, and also mutually communicates with the DMA engines 43 of the other control modules 4-0 to 4-1.

By this configuration, each DMA engine 43 of each control module 4-0 to 4-1 executes communication and data transfer processing (e.g. mirroring processing) which are generated according to an access request from the host computer between the controller 40, connected thereto, and the controllers 40 of the other control modules 4-0 to 4-1.

As FIG. 2 shows, the DMA engine 43 of each control module 4-0 to 4-7 is comprised of a plurality of (two in this case) DMA engines 43-a and 43-b. And each of these two DMA engines 43-a and 43-b is connected to the controller 40 via a PCI-Express bus, for example, as shown in FIG. 2. In other words, in the case of communication and data transfer (DMA) processing between control modules 4-0 to 4-1 (that is between controllers 40 of the control modules 4-0 to 4-1), the data transfer volume is large, so it is desirable to decrease the time required for communication control, therefore both high throughput and low latency (fast response speed) are required. For this, as FIG. 1 and FIG. 2 show, the DMA engine 43 of each control module 4-0 to 4-1 is connected via a bus using high-speed serial transmission (PCI-Express or Rapid-IO), which are designed to satisfy both high throughput and low latency.

PCI-Express and Rapid-IO use 2.5 Gbps high-speed serial transmission, and for the bus interface of both, a low amplitude differential interface called LVDS (Low Voltage Differential Signaling) is used.

Figure 3:
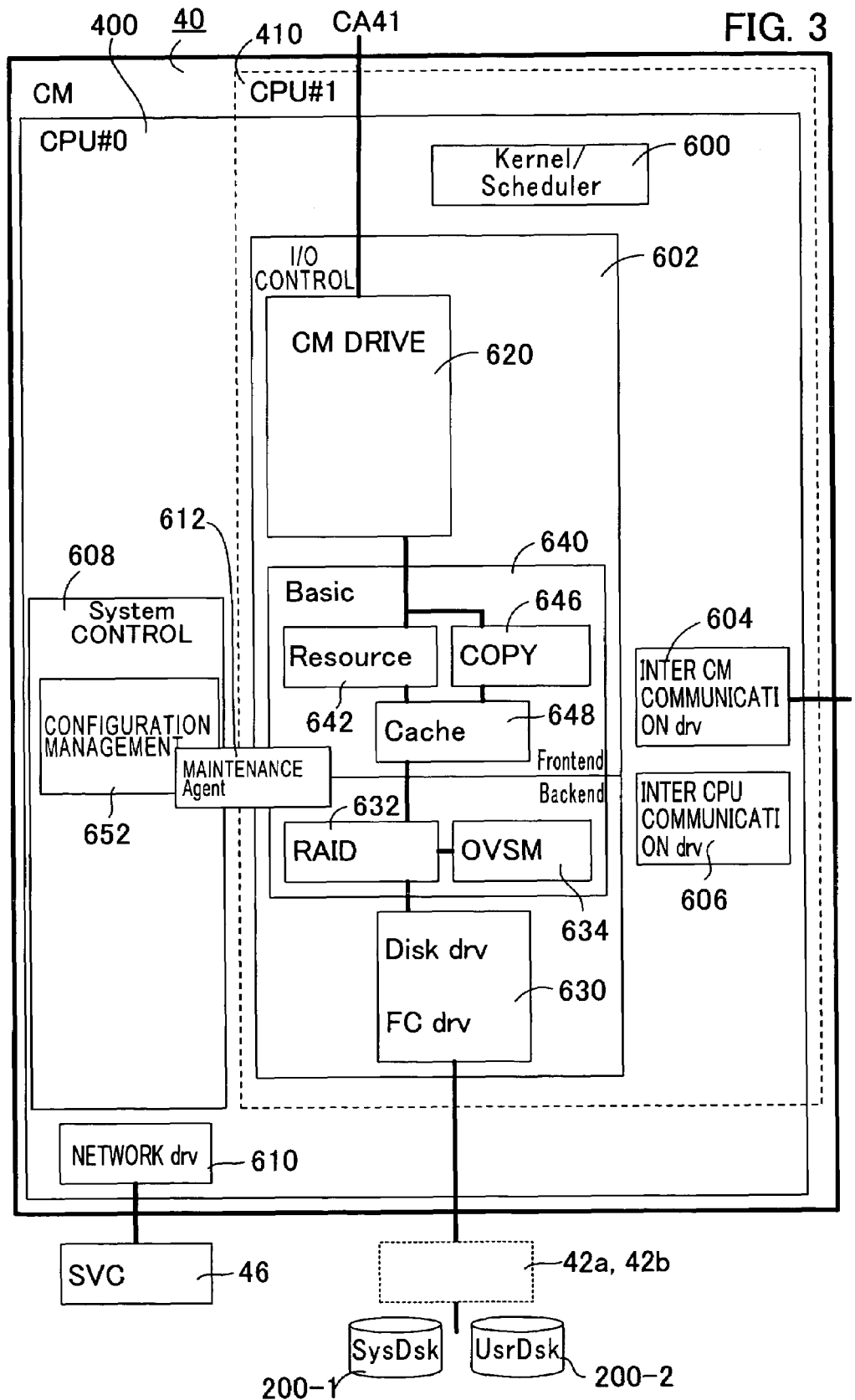
FIG. 3 is a functional block diagram depicting the firmware of the control module in FIG. 1 and FIG. 2.
Figure 4:
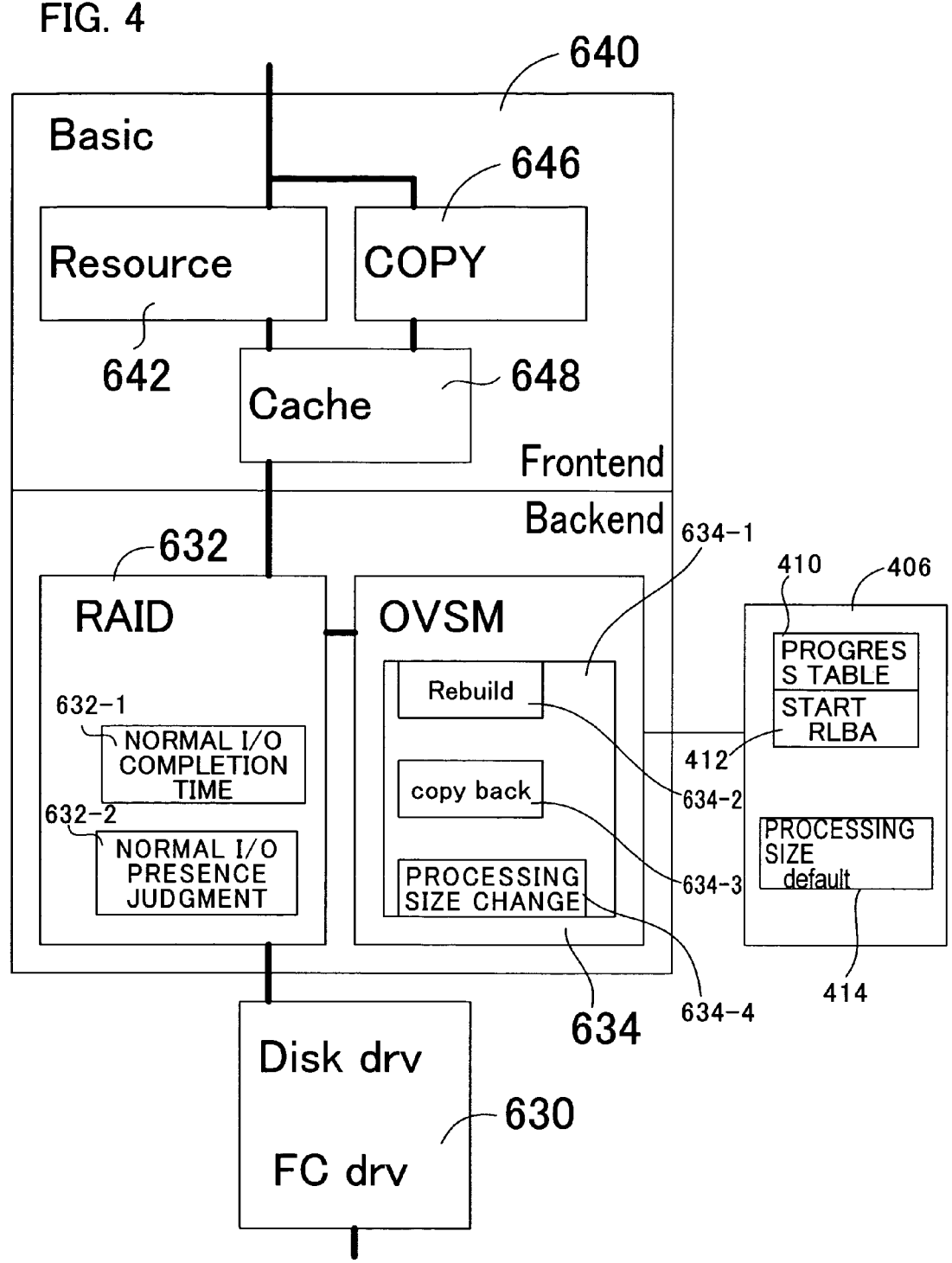
FIG. 4 is a block diagram depicting details of the firmware in FIG. 3.

Thread Configuration:

Now the program modules (called threads) of the software which the CPU 400 (410) executes will be described. FIG. 3 is a block diagram of the threads of this software which the CPU 400 (410) executes, and FIG. 4 is a detailed diagram of a part thereof. As FIG. 3 shows, the software modules has a kernel/scheduler 600, I/O control module 602, inter CM communication driver 604, inter CPU communication driver 606, system control module 608 and network driver 610.

The kernel/scheduler 600 is an operating system, such as MS-DOS®. The IO control module 602 further has a CM-CA driver 620, basic module 640 and CM-DA driver 630. The CM-CA driver 620 is a driver for driving CA (Channel Adapter) 41.

The basic module 630 has a front end, which further has a resource thread (resource control module) 646 for managing a resource, copy thread (copy control module) 646 for performing copy processing, and a cache thread (cache memory control module) 648 for controlling the cache memory of the memory 40b, and a back end, which further has a RAID thread (RAID control module) 632 for performing RAID configuration control, and an OVSM thread (OVSM control module) 634.

The OVSM thread 634 performs the later mentioned Rebuild/Copy back processing. The maintenance agent 612 sends various kinds of notification to the OVSM thread 634. The CM-DA driver 630 is a driver for driving the DA (Disk Adapter) 42. The inter CM communication driver 604 communicates with another CM (Control module), and the inter CPU communication driver 606 communicates with another CPU 410.

The system control module 608 further has a configuration management module 652. The configuration management module 652 creates the configuration definition table, including the RLU (Raid Logical Unit) table for configuration definitions, in the memory 40b, according to the specifications of the service controller 46 via the network driver 610. The service controller 46, which is not illustrated in FIG. 1, is common for each CM.

The disk drive 200 installed in the disk enclosures 2-0 to 2-3 connected to DA 42 is divided into the system disk 200-1 and the user disk 200-2, and the configuration definition table is stored in the system disk 200-1.

The resource module 642 and the RAID module 632 refer to the configuration definition table, and convert a LUN (Logical Unit Number) from the host to a PLBA (Physical Block Address) of the physical disk, and access the physical disk 200.

As FIG. 4 shows, the OVSM thread 634 further has the Rebuild/Copy back module 634-1 for managing the progress of Rebuild/Copy back. The Rebuild/Copy back module 634-1 requests each time of the Rebuild/Copy back processing to the later mentioned RAID control module 632, and receives the response thereof, and records the progress of the Rebuild/Copy back.

The RAID control module 632, on the other hand, acquires a buffer to temporarily save data (hereafter called data buffer), and instructs read or write to the disk device. For Rebuild/Copy back in particular, the RAID control module 632 is in-charge of the processing to read data from the disk device, store it to the data buffer, and write the contents of the data buffer to the disk device.

This RAID control module 632 has a normal I/O completion time recording section 632-1 for recording time when the last normal I/O completes, and a normal I/O presence judgment module 632-2 for comparing the time of the normal I/O completion time recording section 632-1 and the current time, judging if there is a 5 second difference, for example.

The OVSM module 634 has Rebuild/Copy back module 634-1 (Rebuild module 634-2 and Copy back module 634-3) for requesting actual Rebuild/Copy back processing to the RAID control module 632, and a processing size change module 634-4 for calling up the judgment result of the normal I/O presence judgment module 632-2 when the actual processing is requested, and changing the processing size at one time for actual processing depending on the result.

This Rebuild/Copy back module 634-1 refers to a progress table 410 for storing the start LBA created in the memory 40b and a default storage section 414 for storing the default value of the processing size, decides the processing size at one time for actual processing, and requests actual processing.

By this configuration, every time actual Rebuild/Copy back processing is requested to the RAID control module 632, the OVSM module 634 confirms to the RAID control module 632 whether a normal I/O is present (whether 5 seconds or more have elapsed since a normal I/O became absent the last time), receives the result, and changes the parameter (processing size at one time) of the actual Rebuild/Copy back processing to be transferred to the RAID control module 632.

Here 5 seconds or more is used to judge the presence of a normal I/O, because a recognition error is prevented in such a case when a time when an I/O is present and a time when an I/O is absent are alternately repeated. In other words, in a status where a normal I/O arrives on occasion, even if a normal I/O is not present by change at a timing of Rebuild/Copy back, a normal I/O may be generated immediately after the start of Rebuild/Copy back. Such a case is classified into the status where a normal I/O is present, so that the processing of a normal I/O is not waited.

Figure 5:
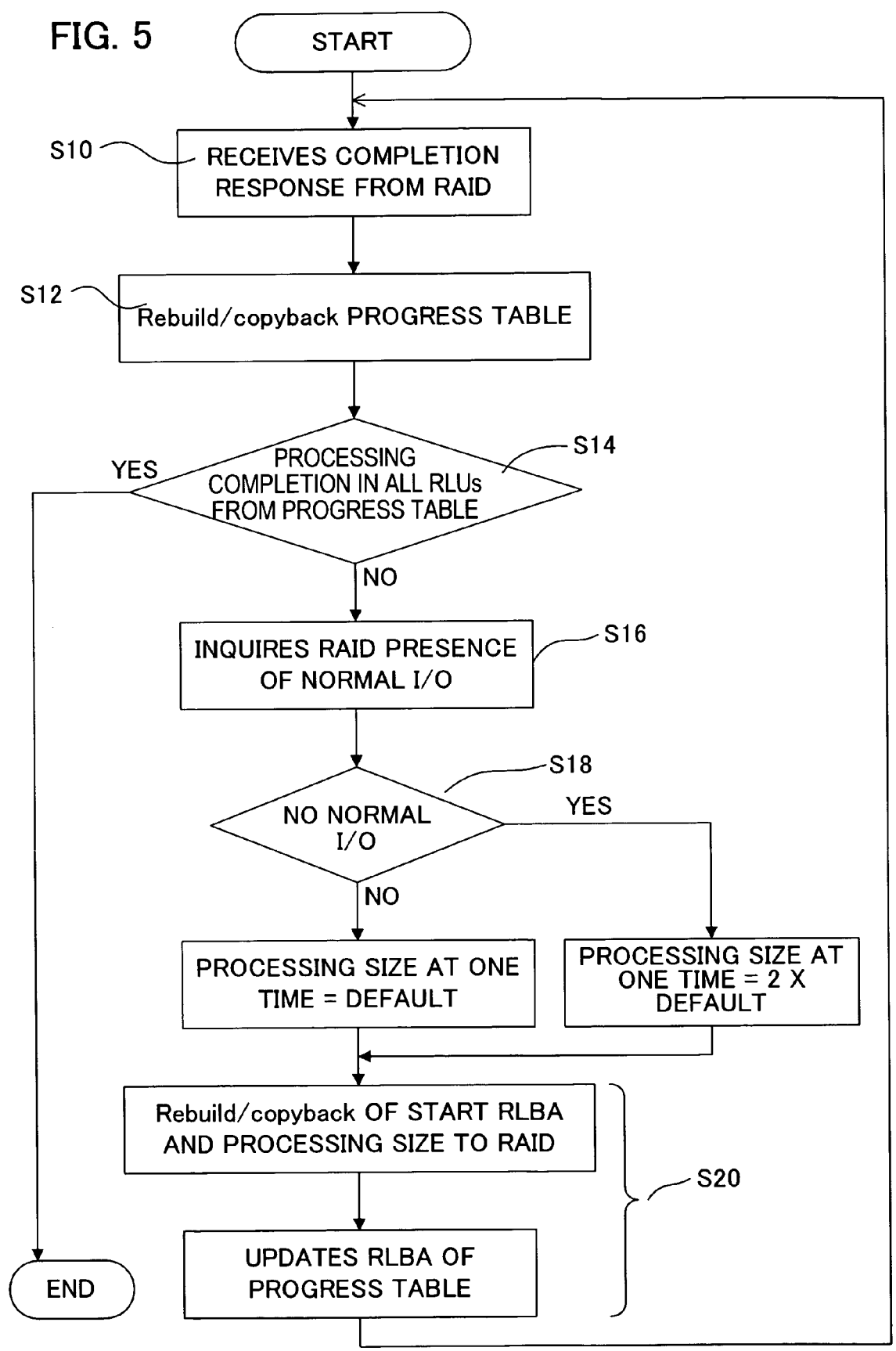
FIG. 5 is a flow chart depicting Rebuild/Copy back processing according to an embodiment of the present invention.
Figure 6:
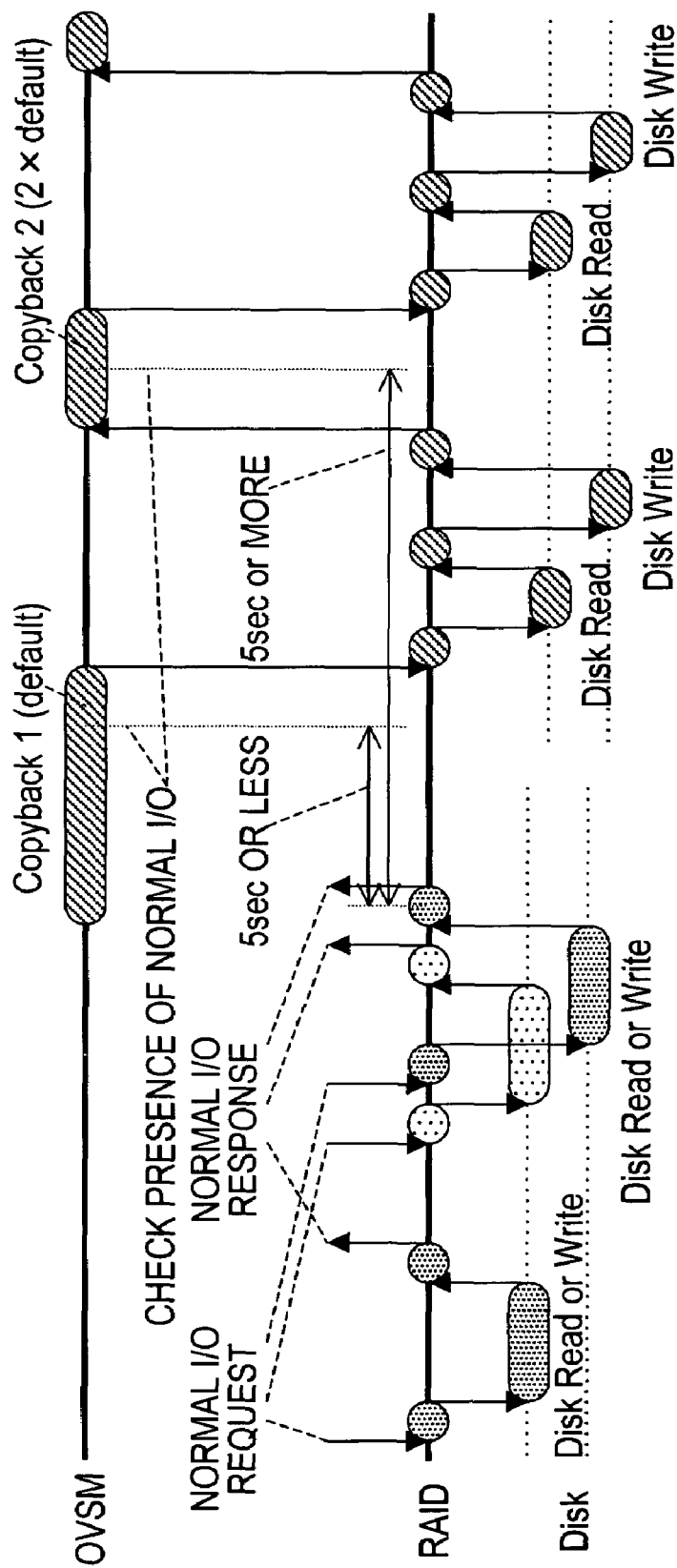
FIG. 6 is a time chart depicting the processing in FIG. 5.
Figure 7:
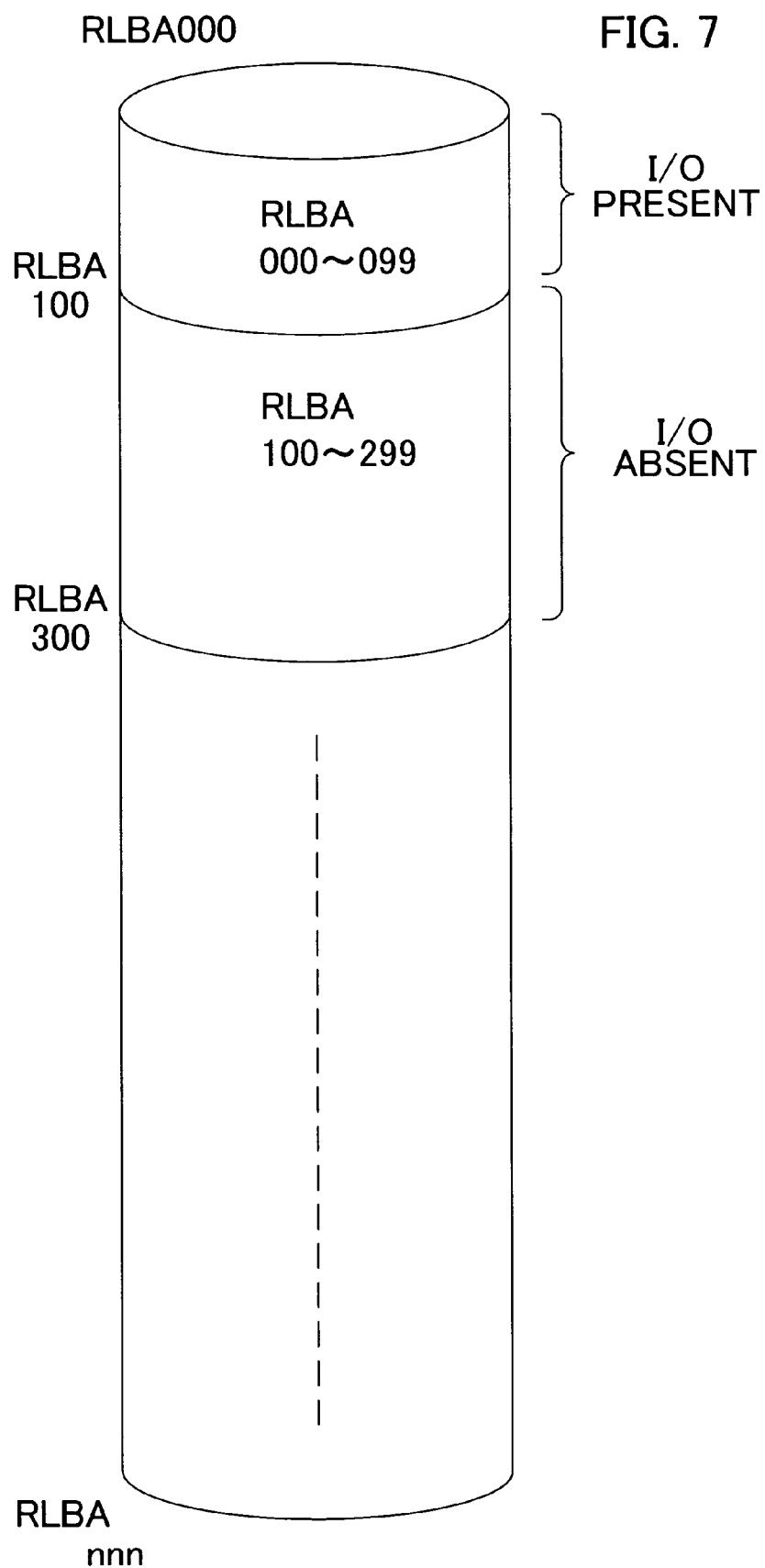
FIG. 7 is a diagram depicting the operation of the processing in FIG. 5.
Figure 8:
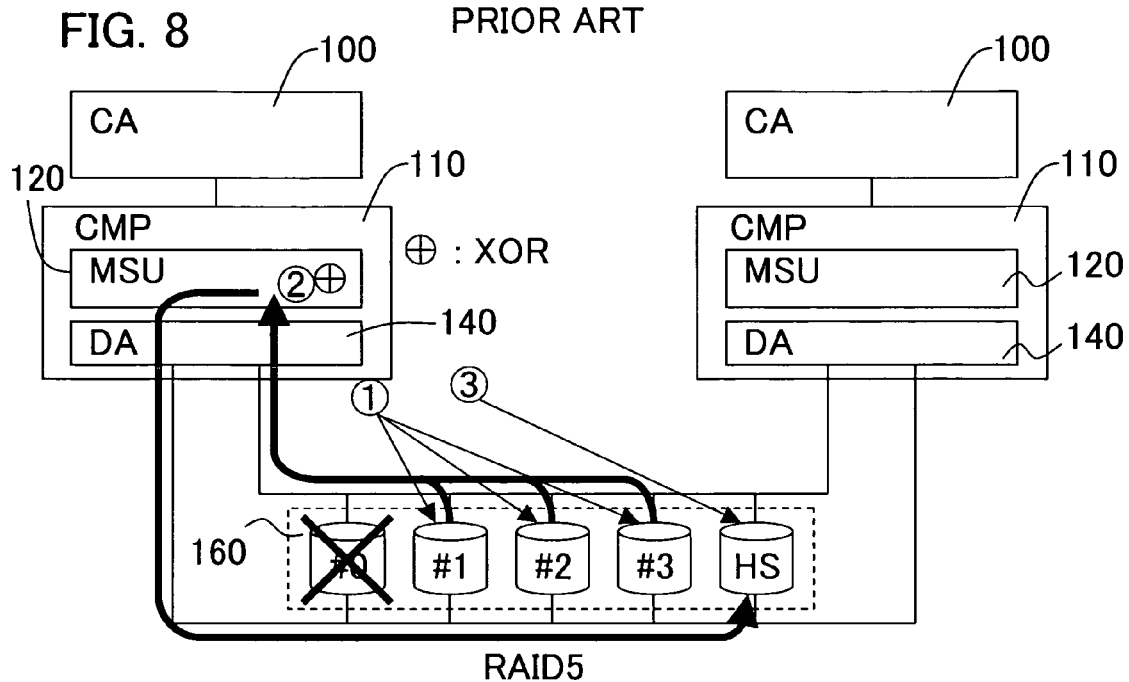
FIG. 8 is a diagram depicting the conventional rebuild processing.
Figure 9:
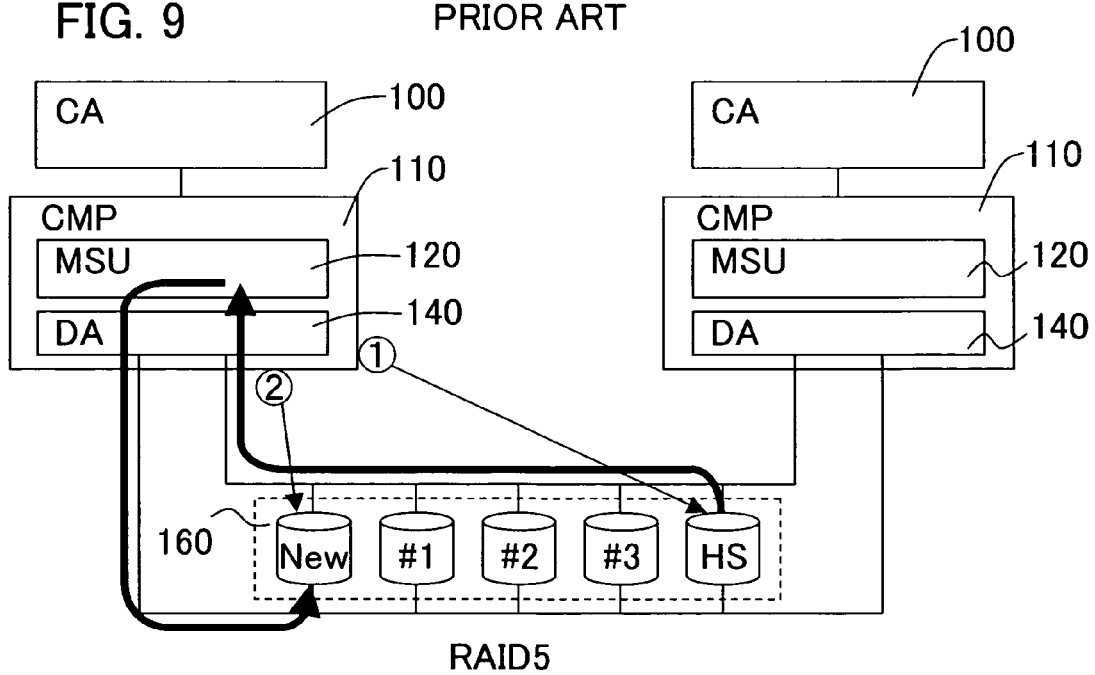
FIG. 9 is a diagram depicting the conventional copy back processing.

Rebuild/Copy Back Processing:

FIG. 5 is a flow chart depicting Rebuild/Copy back processing according to an embodiment of the present invention, FIG. 6 is a time chart thereof, and FIG. 7 is a diagram depicting the operation thereof.

Now the Rebuild/Copy back processing in FIG. 5 will be described with reference to FIG. 6 and FIG. 7.

(S10) First at the beginning of Rebuild/Copy back, the OVSM module 634 confirms that a completion response was received from the RAID control module 632.

(S12) Then the Rebuild/Copy back module 634-1 of the OVSM module 634 refers to the start RLBA of the Rebuild/Copy back progress table 410 of the memory 40b. As FIG. 7 shows, if the target of Rebuild/Copy back processing is LBA (Logical Block Address) '000' to 'nnn' in the RAID configuration, then the start RLBA of the target data of the next Rebuild/Copy back processing is recorded in the start RLBA.

(S14) The Rebuild/Copy back module 634-1 judges whether the processing of all the target RLUs (Raid Logical Units) has been completed from the start RLBA of the progress table 410. If the Rebuild/Copy back module 634-1 judges that the processings of all the RLUs has been completed, the processing ends.

(S16) If the Rebuild/Copy back module 634-1 judges that processing of all the RLUs has not been completed, on the other hand, the Rebuild/Copy back module inquires the presence of a normal I/O to the RAID control module 632. As described in FIG. 4, the RAID control module 632 judges whether 5 seconds or more has elapsed since a normal I/O became absent the last time.

(S18) The Rebuild/Copy back module 634-1 confirms the presence of a normal I/O based on the response from the RAID control module 632, and if a normal I/O is present, the processing size at one time for processing is set to the default value of the memory 40b, as Copy back 1 in FIG. 6 shows. If a normal I/O is absent, the processing size at one time for processing is set to double the default value of the memory 40b, as Copy back 2 in FIG. 6 shows.

(S20) And the Rebuild/Copy back module 634-1 requests the RAID control module 632 for an actual processing which has the start RLBA and the processing size already set. Also the Rebuild/Copy back module 634-1 calculates the next start RLBA by adding the processing size to the start RLBA, and updates the progress table 410 to the calculated RLBA. And the processing returns to step S10.

In this way, a normal I/O present status (hereafter referred to as dynamic status) and a normal I/O absent status (hereafter referred to as static status) are considered, and the processing size at one time is increased in static status. If the size at one time for processing is large, Rebuild/Copy back processing is faster, but the influence on a normal I/O increases.

Therefore in the case of dynamic status, a processing size which does not interrupt processing of normal I/Os is specified, and in the case of static status, a processing size larger than that (e.g. it is desirable for the performance of the disk that the size is 1 track size of the physical disk drive or more) is specified. To specify this size, the parameters when actual Rebuild/Copy back processing is requested from the OVSM module 634 to the RAID control module 632 are simply changed.

In access processing from the host in FIG. 3, when the CA 41 receives a read request from the host, the CA 41 notifies this to the resource module 642 via the CM-CA driver 620, and the resource module 642 accepts this read request.

The resource module 642 requests the cache module 648 to judge whether this is a cache hit or not. The cache module 648 checks whether the data of LBA (OLBA) of the target host LUN exists in the cache area of the memory 40b, and if data exists (hit), the cache module 648 reads the data of the OLBA (host Logical Block Address) of the memory 40b, and transfers the data from CA 41 to the host via the CM-CA driver 620.

If the cache module 648 judges that the data of LBA (OLBA) of the target host LUN does not exist in the cache area of the memory 40b (miss hit), on the other hand, the cache module 648 sends a request to read data from the physical disk to the RAID control module 632 of the back end. The RAID module 632 converts the LBA (OLBA) of the host LUN, for which processing was requested, into the LBA (RLBA) of the RAID group.

Then the RAID control module 632 converts the LBA (RLBA) of the RAID group into the LBA (DLBA) of the virtual disk. Then the RAID control module 632 converts the LBA (DLBA) of the virtual disk, for which processing was requested, into the LBA (PLBA) of the physical disk. This processing is different depending on the RAID configuration (e.g. RAID 1, RAID 5).

Then the RAID module 632 determines the disk enclosure RAID and the slot from the LBA (PLBA) of the physical disk for which processing was requested, and sends the read request to the LBA (PLBA) of the physical disk 200. In other words, RAID module 632 sends a read request for the physical disk to the corresponding DA 42 via the CM-DA driver 630, and accesses this physical disk via disk adapter 42.

The data is read from the physical disk, and the cache module 648 stores it to the cache area of the memory 40b via the DA 42, and when reading completes, the resource module 642 transfers this read data from the CA 41 to the host via the CM-CA driver 620, and the processing ends.

For write processing from the host, the write data is stored once in the cache area of the memory 40b, then is written back to the physical disk according to the internal write back schedule. For this write back as well, address conversion processing using the configuration definition table is executed in processing after a miss hit.

Also the RAID control module 632 prioritizes the normal I/Os, such as a host I/O and an internal I/O (e.g. write back) which were accepted, and the Rebuild/Copy back requests where were accepted, according to a predetermined I/O ratio, and requests processing to the CM-DA module 630 in the lower layer according to this prioritization.

In this way, the processing size at one time for Rebuild/Copy back is changed according to the presence of a normal I/O, which is managed by RAID control, so if a normal I/O is present, Rebuild/Copy back can be executed without interrupting the processing of the normal I/O, and in static status, a processing size larger than that is specified, so as to implement Rebuild/Copy back processing at high-speed.

Also the RAID control module 632 performs normal I/O presence judgment processing where the time when the last normal I/O was completed is recorded, this time and current time are compared, and it is judged whether the difference is 5 seconds or more, for example, so the Rebuild/Copy back module 634-1 can advance Rebuild/Copy back processing with easily changing the processing size by an inquiry.

Other Embodiments

In the above embodiments, the disk array device having the configuration in FIG. 1 was described, but the present invention can be applied to a disk array device with other configurations. The physical disk can be a magnetic disk, optical disk, magneto-optical disk and various storage devices.

Also the time to monitor the presence of a normal I/O was 5 seconds, but may be another monitoring time, and the judgment of the presence of an I/O may be executed by the OVSM module. The processing size was changed to double the default value, but another multiple, such as 1.5, may be used, and the processing size may be set separately depending on the presence of a normal I/O.

The present invention was described above using embodiments, but the present invention can be modified in various ways within the scope of the essential character of the present invention, and these variant forms shall not be excluded from the scope of the present invention.

As described above, the processing size at one time for Rebuild/Copy back processing is changed according to the presence of a normal I/O, managed by RAID control, so if a normal I/O is present, Rebuild/Copy back can be executed without interrupting the processing of a normal I/O, and in static status where the normal I/O is absent, a processing size larger than that is specified, so as to implement Rebuild/Copy back processing at high-speed.

What is claimed is:

1. A RAID system for accessing a connected disk device according to an I/O request requested from a host and executing the I/O request, comprising:

a plurality of the disk devices constituting the RAID; and a controller for executing Rebuild or Copy back processing for reconstructing a RAID configuration, when one of the plurality of disk devices fails, by executing in parts a plurality of times of operation to read data of a disk device, other than the failed disk device, and to write data to a spare disk device or a new disk device, wherein the controller judges whether a normal I/O request, including an I/O request from the host, does not arrive for a predetermined time, and when a normal I/O request does not arrive for a predetermined time, sets larger the request processing size for one time of Rebuild or Copy back processing, which is to be executed in parts for a plurality of times, compared with the size in the case when the normal I/O request arrives within the predetermined time, wherein the controller executes balancing the normal I/O request and a request for one time of the Rebuild/Copy back, and issues the next Rebuild/Copy back request according to the completion of processing of the Rebuild/Copy back request;

wherein when a normal I/O request does not arrive for a predetermined time, the controller sets the request processing size for one time of the Rebuild or Copy back processing to be a multiple of the processing size of the case when the I/O request arrives within the predetermined time.

2. The RAID system according to claim 1, wherein the controller records the processing completion time of a normal I/O request each time when processing of the normal I/O request completes, and compares the processing completion time with current time to judge whether a normal I/O request does not arrive for a predetermined time.

3. The RAID system according to claim 1, wherein the controller further comprises a progress table for managing the progress status of the Rebuild/Copy back processing, and wherein the controller creates a request for one time of Rebuild or Copy back processing according to the progress table, and updates the progress table.

4. The RAID system according to claim 1 wherein the controller further comprises:

a RAID control module for executing balancing the normal I/O request and a request for one time of the Rebuild/Copy back; and a Rebuild/Copy back module for referring to a progress table for managing the progress status of the Rebuild/Copy back processing, and issuing the next Rebuild/Copy back request according to the completion of processing of the Rebuild/Copy back request.

5. The RAID system according to claim 4, wherein the RAID control module records the processing completion time of a normal I/O request each time when the processing of the normal I/O request completes, and compares the processing completion time with current time to judge whether a normal I/O request does not arrive for a predetermined time, and the Rebuild/Copy back module inquires of the RAID control module about the judgment result, and when a normal I/O request does not arrive for a predetermined, the Rebuild/Copy back module issues the Rebuild/Copy back request by setting the request processing size for one time of the Rebuild/Copy back larger, compared with the size in the case when the normal I/O request arrives within the predetermined time.

6. The RAID system according to claim 1, wherein the controller further comprises:

a first interface circuit for controlling interface with the host;

a second interface circuit for controlling interface with the plurality of disk devices; and a control unit which is connected to the first interface circuit and the second interface circuit for executing the normal I/O processing and the Rebuild or Copy back processing, and wherein the control unit judges whether a normal I/O request, including an I/O request from the host, does not arrive for a predetermined time, and when a normal I/O request does not arrive for a predetermined time, sets larger the request processing size for one time of Rebuild or Copy back processing, which is to be executed in parts for a plurality of times, compared with the size in the case when the normal I/O request arrives within the predetermined time.

7. The RAID system according to claim 1, wherein when one of the plurality of disk devices constituting the RAID fails, the controller executes the operation to read data of a disk device, other than the failed disk device, and to write data to a spare disk device in parts for a plurality of times so as to reconstruct the RAID configuration, then executes Copy back processing by executing, in parts for a plurality of times, operation to read data of the spare disk device and to write data to a new disk device provided in place of the failed disk device.

8. A RAID system for accessing a connected disk device according to an I/O request requested from a host and executing the I/O request, comprising:

a plurality of the disk devices constituting the RAID; and a controller for executing Rebuild or Copy back processing for reconstructing a RAID configuration, when one of the plurality of disk devices fails, by executing in parts a plurality of times of operation to read data of a disk device, other than the failed disk device, and to write data to a spare disk device or a new disk device, wherein the controller judges whether a normal I/O request, including an I/O request from the host, does not arrive for a predetermined time, and when a normal I/O request does not arrive for a predetermined time, sets larger the request processing size for one time of Rebuild or Copy back processing, which is to be executed in parts for a plurality of times, compared with the size in the case when the normal I/O request arrives within the predetermined time, wherein the controller executes balancing the normal I/O request and a request for one time of the Rebuild/Copy back, and issues the next Rebuild/Copy back request according to the completion of processing of the Rebuild/Copy back request;

wherein when a normal I/O request does not arrive for a predetermined time, the controller sets the request processing size for one time of the Rebuild or Copy back processing to be a multiple of the processing size of the case when the I/O request arrives within the predetermined time, wherein the control unit further comprises a RAID control module for executing balancing the normal I/O request and a request for one time of the Rebuild/Copy back;

a Rebuild/Copy back module for referring to a progress table for managing the progress status of the Rebuild/Copy back processing, and issuing the next Rebuild/

Copy back request according to the completion of processing of the Rebuild/Copy back request; and a cache memory for storing a part of the data of the disk device, wherein said control unit requests an I/O request that cannot use the cache memory, out of the I/O requests from the host, as the normal I/O.

9. A Rebuild/Copy back processing method for a RAID system for accessing a connected disk device according to an I/O request requested from a host and executing the I/O request, comprising the steps of:

executing Rebuild or Copy back processing for reconstructing the RAID configuration, when one of the plurality of disk device constituting the RAID fails, by executing in parts a plurality of times of operation to read data of a disk device, other than the failed disk device, and to write data to a spare disk device or a new disk device;

judging whether a normal I/O request, including an I/O request from the host, does not arrive for a predetermined time; and setting the request processing size for one time of Rebuild or Copy back processing to be executed in parts for a plurality of times larger, when a normal I/O request does not arrive for a predetermined time, compared with the size in the case when the normal I/O request arrives within the predetermined time, the method further comprising a step of executing balancing the normal I/O request and a request for one time of the Rebuild/Copy back, wherein the step of executing the Rebuild/Copy back processing further comprises a step of issuing the next Rebuild/Copy back request according to the completion of processing of the Rebuild/Copy back request;

wherein the setting step further comprises a step of setting the request processing size for one time of the Rebuild or Copy back processing to be a multiple of the processing size when a normal I/O request does not arrive for a predetermined time, compared with the processing size in the case when the normal I/O request arrives within the predetermined time.

10. The Rebuild/Copy back processing method for a RAID system according to claim 9, wherein the judgment step further comprises:

a step of recording the processing completion time of a normal I/O request each time when the processing of the normal I/O request completes; and a step of comparing the processing completion time with current time to judge whether a normal I/O request arrives for a predetermined time.

11. The Rebuild/Copy back processing method for a RAID system according to claim 9, wherein the step of executing the Rebuild/Copy back processing further comprises the steps of:

referring to a progress table for managing the progress status of the Rebuild/Copy back and creating a request for one time of Rebuild or Copy back processing; and updating the progress table.

12. The Rebuild/Copy back processing method for a RAID system according to claim 9, further comprising a step of executing balancing the normal I/O request and a request for one time of the Rebuild/Copy back by a RAID control module, wherein the processing step further comprises a step of referring to a progress table for managing the progress status of the Rebuild/Copy back processing according to the completion of processing of the Rebuild/Copy back request, and issuing the next Rebuild/Copy back request to the RAID control module.

13. The Rebuild/Copy back processing method for a RAID system according to claim 12, wherein the judgment step further comprises:

a step of, by the RAID control module, recording the processing completion time of a normal I/O request each time when the processing of the normal I/O request completes; and a step of comparing the processing completion time and current time to judge whether a normal I/O request does not arrive for a predetermined time, and wherein the step of issuing the Rebuild/Copy back request further comprises:

a step of inquiring of the RAID control module about the judgment result; and a step of issuing the Rebuild/Copy back request by setting the request processing size for one time of the Rebuild or Copy back processing larger, when a normal I/O request does not arrive for a predetermined time, compared with the size in the case when the normal I/O request arrives within the predetermined time.

14. The Rebuild/Copy back processing method for a RAID system according to claim 9, wherein the judgment step further comprises a step of judging whether a normal I/O request, including an I/O request from the host, does not arrive for a predetermined time by a control unit which is connected to a first interface circuit for controlling interface with the host, and a second interface circuit for controlling interface with the plurality of disk devices for executing the normal I/O processing and the Rebuild or Copy back processing, and the setting step further comprises a step of setting the request processing size for one time of Rebuild or Copy back processing to be executed in parts for a plurality of times larger, when a normal I/O request does not arrive for a predetermined time, compared with the size in the case when the normal I/O request arrives within the predetermined time.

15. The Rebuild/Copy back processing method for a RAID system according to claim 9, wherein the step of executing the Rebuild/Copy back processing further comprises:

a Rebuild processing step of reconstructing the RAID configuration, when one of the plurality of disk devices constituting the RAID fails, by executing operation to read data of a disk device, other than the failed disk device, and to write the data to a spare disk device in parts for a plurality of times; and a step of executing the Copy back processing after executing the Rebuild processing, by executing, in parts for a plurality of times, operation to read data of the spare disk device and to write data to a new disk device provided in place of the failed disk device.

16. A Rebuild/Copy back processing method for a RAID system for accessing a connected disk device according to an I/O request requested from a host and executing the I/O request, comprising the steps of:

executing Rebuild or Copy back processing for reconstructing the RAID configuration, when one of the plurality of disk device constituting the RAID fails, by executing in parts a plurality of times of operation to read data of a disk device, other than the failed disk device, and to write data to a spare disk device or a new disk device;

judging whether a normal I/O request, including an I/O request from the host, does not arrive for a predetermined time; and setting the request Processing size for one time of Rebuild or Copy back processing to be executed in parts for a plurality of times larger, when a normal I/O request does not arrive for a predetermined time, compared with the size in the case when the normal I/O request arrives within the predetermined time, the method further comprising a step of executing balancing the normal I/O request and a request for one time of the Rebuild/Copy back, wherein the step of executing the Rebuild/Copy back processing further comprises a step of issuing the next Rebuild/Copy back request according to the completion of processing of the Rebuild/Copy back request;

wherein the setting step further comprises a step of setting the request processing size for one time of the Rebuild or Copy back processing to be a multiple of the processing size when a normal I/O request does not arrive for a predetermined time, compared with the processing size in the case when the normal I/O request arrives within the predetermined time;

further comprising a step of executing balancing the normal I/O request and a request for one time of the Rebuild/Copy back by a RAID control module, wherein the processing step further comprises a step of referring to a progress table for managing the progress status of the Rebuild/Copy back processing according to the completion of processing of the Rebuild/Copy back request, and issuing the next Rebuild/Copy back request to the RAID control module;

further comprising a step of requesting an I/O request that cannot use a cache memory, which stores a part of the data of the disk device, as the normal I/O, out of the I/O requests from the host.

* * * * *